United States Patent
Weihs

(10) Patent No.: US 9,465,709 B2
(45) Date of Patent: Oct. 11, 2016

(54) SYSTEM AND METHOD FOR PROVIDING PERFORMANCE SAMPLING IN A COMPUTING SYSTEM

(71) Applicant: NetApp, Inc., Sunnyvale, CA (US)

(72) Inventor: Joseph Weihs, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 79 days.

(21) Appl. No.: 14/088,090

(22) Filed: Nov. 22, 2013

(65) Prior Publication Data

US 2015/0149663 A1  May 28, 2015

(51) Int. Cl.
- G06F 3/00 (2006.01)
- G06F 13/00 (2006.01)
- G06F 11/30 (2006.01)
- G06F 11/34 (2006.01)

(52) U.S. Cl.
CPC ....... *G06F 11/3034* (2013.01); *G06F 11/3096* (2013.01); *G06F 11/348* (2013.01); *G06F 2201/81* (2013.01); *G06F 2201/88* (2013.01)

(58) Field of Classification Search
CPC .......... G06F 11/3089; G06F 11/3409; G06F 11/3452
USPC ...................................... 710/18, 24, 34, 100
See application file for complete search history.

(56) References Cited

U.S. PATENT DOCUMENTS

| | | | | |
|---|---|---|---|---|
| 6,734,878 B1* | 5/2004 | DeLuca | ............... | H04L 41/0806 709/220 |
| 7,296,132 B1* | 11/2007 | Gross | ................... | G06F 11/3476 707/999.101 |
| 7,467,263 B2* | 12/2008 | Ozaki | ................... | G06F 3/0613 709/217 |
| 2006/0112247 A1* | 5/2006 | Ramany | ................ | G06F 3/0605 711/165 |
| 2008/0052435 A1* | 2/2008 | Norwood | ............. | H05K 7/1467 710/301 |
| 2008/0071939 A1* | 3/2008 | Tanaka | ................ | G06F 11/3419 710/18 |
| 2008/0126645 A1* | 5/2008 | Yamaguchi | ........... | G06F 3/0613 710/117 |
| 2008/0301325 A1* | 12/2008 | Hirata | ................. | G06F 11/3433 710/15 |
| 2009/0119466 A1* | 5/2009 | Gower | ................ | G06F 11/3419 711/154 |
| 2010/0057951 A1* | 3/2010 | Ellis | ..................... | A61B 5/1038 710/33 |
| 2011/0172968 A1* | 7/2011 | Davis | .................. | G06F 9/30145 702/186 |

\* cited by examiner

*Primary Examiner* — Ernest Unelus
*Assistant Examiner* — Getente A Yimer
(74) *Attorney, Agent, or Firm* — Klein, O'Neill & Singh, LLP

(57) ABSTRACT

A method performed by a computer system, the method including maintaining a plurality of work-based counters, each of the work-based counters being associated with a respective functional entity of a plurality of functional entities, in response to determining that a first one of the work-based counters has reached a threshold, sampling a performance data of a first functional entity associated with the first one of the work-based counters, and presenting the sampled performance data to an analysis tool separate from an operating system of the computer system.

17 Claims, 3 Drawing Sheets

SYSTEM AND METHOD FOR PROVIDING PERFORMANCE SAMPLING IN A COMPUTING SYSTEM

TECHNICAL FIELD

The present disclosure relates generally to computing system monitoring and, more particularly, to performance sampling in computing systems.

BACKGROUND

Information storage systems may include a variety of different hardware and software components. For instance, a storage system may include one or more storage controllers, where each of the storage controllers provides the low-level control for a plurality of physical storage drives. The storage system may also include network connections and other items that are ancillary to the storage functionality of the system. Storage systems continue to become more and more complex, with storage controllers hosting an increasing number of logical storage volumes and storage controllers being clustered rather than simply standing alone.

Conventional storage systems sample performance data of the various components on a time-based schedule in order to facilitate performance monitoring, optimization, planning and troubleshooting. In one example system, a given logical storage volume stores data to a multitude of underlying physical storage devices, and the performance of each of the storage devices affects the overall performance of the logical storage volume. The storage controller has a performance reporting function that samples performance data of the logical volume and transmits the performance data to one or more analytical programs. The storage controller samples the performance data of the logical volume (including, among other things, performance data of the underlying physical storage drives) at intervals set by a system clock, e.g., once every five minutes.

The processing power used in reporting the sampled performance data is overhead in the storage system because it does not relate directly to storage operations being performed. As the number of logical volumes in a storage system increases, the amount of data sampled and transferred also increases, thereby increasing overhead. This means that as storage systems grow and more objects (e.g., logical volumes) are allocated by a user, the overhead of performance data collection grows without direct relation to the actual performance of the system. Longer term, object growth is expected to continue making the current approach untenable.

One way to compensate for the increased amount of sampled and transferred data is to reduce the frequency of sampling and transferring. Reducing the sampling and transferring frequency can reduce system overhead, but at a cost of reduced data resolution. Reduced data resolution may make some troubleshooting more difficult or impossible. There is currently no solution that reduces overhead without reducing data resolution.

DETAILED DESCRIPTION

Figure 1:
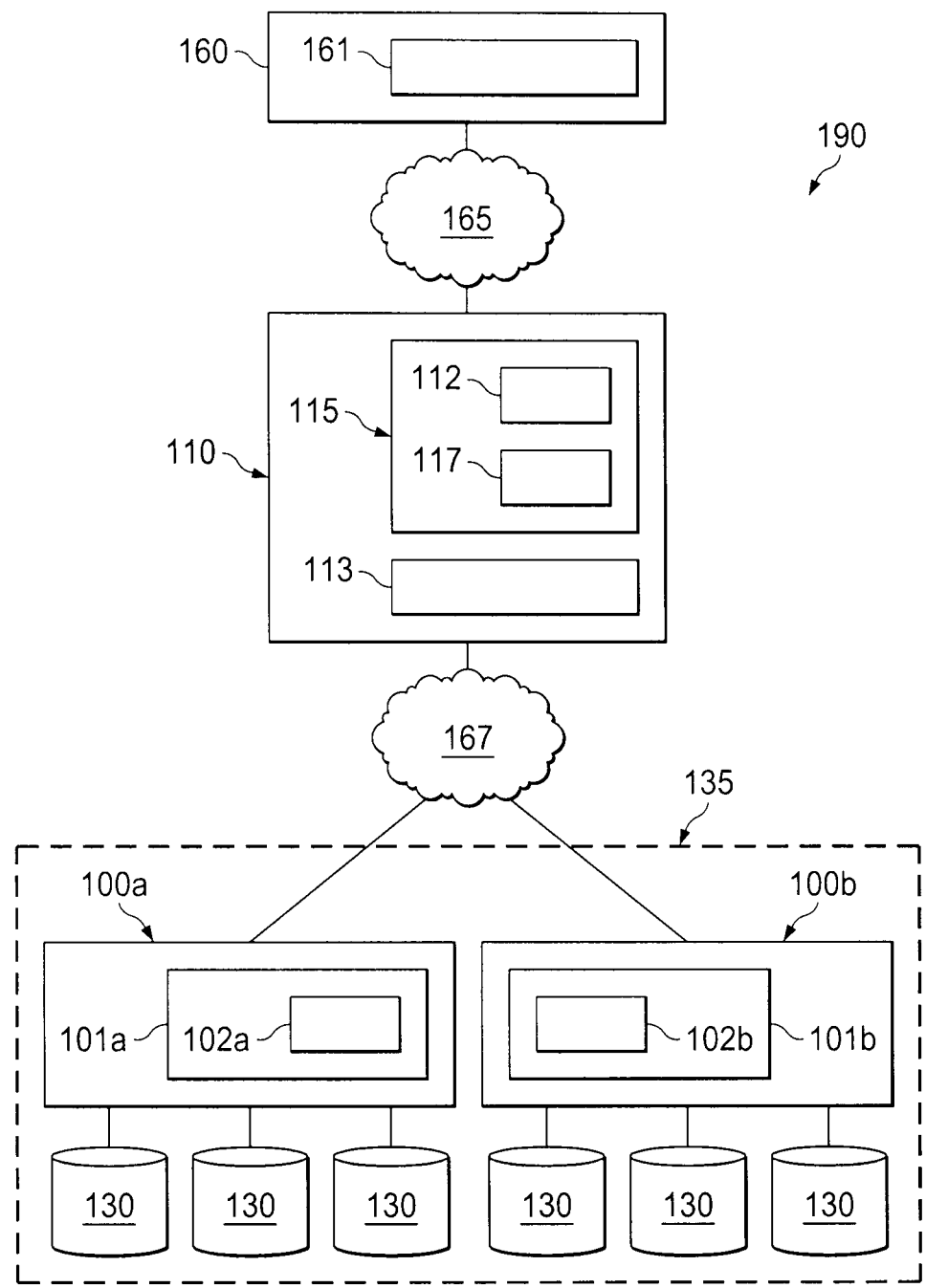
FIG. 1 is a simplified diagram of an example computing system according to some embodiments.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Various embodiments of the present disclosure provide for techniques of performance sampling according to a work-based counter, rather than a time-based counter. One example embodiment includes a storage system with a storage controller that samples performance data for a variety of different physical storage entities and reports the performance data to a management tool For instance, the storage controller may control hundreds of logical volumes, and each logical volume may save data to dozens of physical storage drives in the storage system.

Continuing with the example, the storage controller runs a storage operating system that includes performance counters for each of the logical volumes. Thus, for each read, write and metadata operation, a performance counter is incremented for the logical volume that performed the operation. The storage operating system increments the performance counters continually as operations are performed. A performance collection tool running on the storage operating system compares each of the counters to set threshold values. As a particular counter reaches a threshold value, the performance collection tool determines that the threshold has been met and, in response, samples performance data for the logical volume that corresponds to the counter.

The performance data for the logical volume may include any of a variety of data tracked by the system that has an informational value with respect to how the logical volume has performed. Examples include software counters at the physical storage drives that describe time taken to fetch data, software counters that track errors at network connections, and the like. The performance collection tool samples those system performance counters for use by a management tool. The performance management tool in this example is separate from the storage controller and does not run on the storage operating system, though the scope of embodiments is not so limited.

The above example refers to logical volumes as a functional storage entity of interest, and various embodiments may sample and transmit performance data for any object in a storage cluster, such as storage volumes generally (whether logical or otherwise) aggregates of storage drives, and nodes. Continuing with the example, the performance collection tool continues to monitor the performance counters and samples performance data for the various functional storage entities as thresholds are met. Thus, performance data for individual ones of the functional storage entities may be sampled and transmitted at different times, rather than all at once as in conventional systems. Furthermore, performance data is sampled and transmitted more often for those functional storage entities that are performing more work.

The performance management tool receives the data from the performance collection tool, processes the data, and performs analytics on the processed data. In some embodiments, the management tool includes a Graphical User Interface (GUI) that allows a human user to interact with the management tool to request charts and graphs and other useful information for troubleshooting and performance monitoring. The scope of embodiments is not limited to any particular management tool or to any particular analytic algorithm.

In another example, the storage controller samples the performance data at fixed time intervals and then filters the data using a work-based counter. For instance, after having sampled the performance data for all, or a subset of, the functional storage entities, the collection tool then filters the sampled data. The collection tool filters the data using the performance counters to eliminate performance data associated with functional storage entities that have not reached a threshold level at its respective performance counter. The collection tool then transmits the filtered sample data to the management tool. In both of the examples above, the sampled performance data is sent to the management tool in accordance with a work-based counter of the storage system.

The example above describes a work-based counter that tracks a number of operations performed by a functional storage entity. Various embodiments may employ any appropriate work-based counter, such a counter that tracks throughput. For instance, some storage operating systems may track throughput in bits (or megabits, gigabits, etc.) for each functional storage entity. A throughput work-based counter can be used as a trigger for sampling or as a filter, according to throughput thresholds, in the same way that the operation thresholds are used in the other examples above.

Various embodiments provide one or more advantages over conventional systems. For instance, various embodiments produce data that is highly relevant to performance monitoring—data regarding high-workload functional storage entities—while minimizing less relevant data by producing less sampled data from lightly-used functional storage.

The example of FIG. 1 below is directed to a network storage system, and the scope of embodiments is applicable to a wide variety of computer systems other than storage systems. Accordingly, the concepts described herein for collecting and sending performance data may be applied to computing systems generally.

FIG. 1 is an illustration of a network storage system 190 adapted according to one embodiment. Various embodiments of the present disclosure may be implemented by the network storage system 190, as described in more detail below.

The system 190 includes server system 110 connected to client system 160 via a network 165. The server system 110 accesses storage subsystems 100 that are connected to the server system 110 via a network 167. The storage subsystems 100 are included in a cluster 135. Each storage system 100 in the cluster 135 includes a set of storage devices 130 for storing client data, the storage devices 130 of the cluster 135 providing the shared storage of the storage system 100.

Each storage subsystem 100 also includes a storage controller 101. Each storage controller 101 exercises low-level control over physical storage devices 130 to provide virtualized storage to server system 110 and client 160. Examples of storage hardware that can be used as physical storage devices 130 includes, e.g., hard disk drives and solid state drives, though the scope of embodiments is not limited to any particular storage hardware.

Each storage device 130 may store data from logical storage entities such as one or more storage volumes, where each volume has a file system implemented on the volume. A file system implemented on the logical storage entity may provide multiple directories in a single volume, each directory containing various filenames each of which may be mapped to a multitude of storage devices 130. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), Unix™ file system, and the like. For the Data ONTAP™ storage operating system (available from NetApp, Inc. of Sunnyvale, Calif.) which may implement a Write Anywhere File Layout (WAFL™) file system, there is typically a WAFL™ file system within each volume, and within a WAFL file system, there may be one or more logical units (LUs). The scope of embodiments is not limited to any particular storage operating system or file system.

Continuing with the example, to facilitate access to the storage drives 130, the storage operating system implements a write-anywhere file system of a virtualization system that virtualizes the storage space provided by storage drives 130. The file system logically organizes the information as a hierarchical structure of named directory and file objects on the storage drives 130. Each on-disk file may be implemented as set of blocks configured to store information, such as data, whereas the directory may be implemented as a specially formatted file in which names and links to other files and directories are stored. The virtualization system allows the file system to further logically organize information as a hierarchical structure of named virtual disks ("vdisks") on the storage drives 130, thereby providing an integrated NAS and SAN storage system approach to storage by enabling file-based (NAS) access to the named files and directories, while further enabling block-based (SAN) access to the named vdisks on a file system based storage platform. The file system simplifies the complexity of management of the underlying physical storage in SAN deployments.

Client system 160 may run one or more applications (e.g., word processing or database programs, typified by application 161) that utilize the storage system. Client system 160 includes a computer system that interacts with server system 110 for submitting read/write access requests and for receiving or transmitting data from or to the server system 110 over the network 165. In a virtual server environment, application 161 on client system 160 may interact over the network 165 with one or more virtual machines (VMs) 115 executing on server system 110.

As mentioned above, various embodiments include a performance management tool that receives the sampled data from a collection tool. System 190 includes a performance management tool that is implemented as an application. For instance, a performance management tool can be implemented as application 161 at client 160. Additionally or alternatively, the performance management tool may be implemented as one of applications 112 117. For the purposes of this example, application 117 is described as the performance management tool. The performance management tool 117 receives the sampled data from collection tools 102, which are described in more detail below.

Server system 110 includes a computer system that executes applications and interacts with the client system 160 for receiving read/write access requests and receiving or transmitting data from or to the client system 160 over the network 165. Server system 110 in this example is connected to the client system 160 over a network 165 such as a local area network (LAN), an Ethernet subnet, a PCI or PCIe subnet, a switched PCIe subnet, a wide area network (WAN), a metropolitan area network (MAN), the Internet, or the like.

The server 110 may include any appropriate computer hardware and software. In one example, server 110 includes a general-purpose computer configured to execute any of a variety of operating systems, including the Unix™, Linux™, and Microsoft Windows™ operating systems.

Various embodiments may be implemented in a Network Attached Storage (NAS) system and in a Storage Area Network (SAN) system. Server systems generally utilize file-based access protocols when accessing information (in the form of files and directories) over a NAS-based network. In such an example, server 110 may request the services of the storage cluster 135 by issuing file access protocol messages (in the form of packets) to the storage cluster 135 over the network 167. For example, a server 110 running the Windows™ operating system may communicate with the storage cluster 135 using the Common Internet File System (CIFS) protocol. On the other hand, a server 110 running the Unix™ operating system may communicate with the multi-protocol storage system using the Network File System (NFS) protocol 164 over TCP/IP 162. The scope of embodiments is not limited to any particular operating system for server 110 nor to any particular file access protocols.

Server 110 may utilize block-based access protocols, such as the Small Computer Systems Interface (SCSI) protocol, when accessing information (in the form of blocks, storage drives or vdisks) over a SAN-based network. SCSI is an input/output (I/O) interface with a standard, device independent protocol that allows different peripheral devices, such as disks 130, to attach to the storage subsystems 100. In SCSI terminology, server 110 operating in a SAN environment is an initiator that initiates requests and commands for data. A given storage system 100 is thus a target configured to respond to the requests issued by the initiator in accordance with a request/response protocol.

Server system 110 includes hypervisor 113, which creates and manages one or more Virtual Machines (VMs)—in this case, VM 115. The present example shows only a single VM 115, though in other embodiments, the server 110 includes multiple VMs (not shown), each VM being used by and connected with a client 160 through computer network 165. Thus, systems with more than one client 160 may include more than one VM 115, each client being supported by at least one VM. VM 115 includes an encapsulation or instance of an operating system and applications 112 and 117 executing on top of that instance. Briefly, application 112 provides read/write access to the clients 160 to data stored in cluster 135. Application 117 is a performance management tool that receives sampled performance data from collection tools 102. In some embodiments, different types of VM hypervisors 113 may be used (e.g., VMware™ ESX, Microsoft™ Hyper-V, etc.).

Each storage system 100 is configured to allow server 110 to access its data, for example, to read or write data to the storage system. The server 110 executes application 112 that "connects" to storage systems 100 over computer network 167 to send an access request (read or write request) to storage system 100 for accessing particular data stored on the storage system 100. The VM application 112 executing on the server 110 services the connected client 160 by receiving the client access requests and submitting the access requests to the storage system 100 for execution.

The scope of embodiments is not limited to the particular architecture of system 190. For instance, other systems may include additional servers, each server being similar to server 110. While the example of FIG. 1 shows only one client 160, it is understood that any appropriate number of clients may be supported by the system 190. Moreover, while cluster 135 shows two storage subsystems 100a and 100b, it is understood that any appropriate number of controllers and storage drive arrays may be used with various embodiments. For instance, some embodiments may include only a single storage subsystem, whereas other embodiments may include three or more storage subsystems. In other words, the scope of embodiments is not limited to a single storage cluster.

Figure 2:
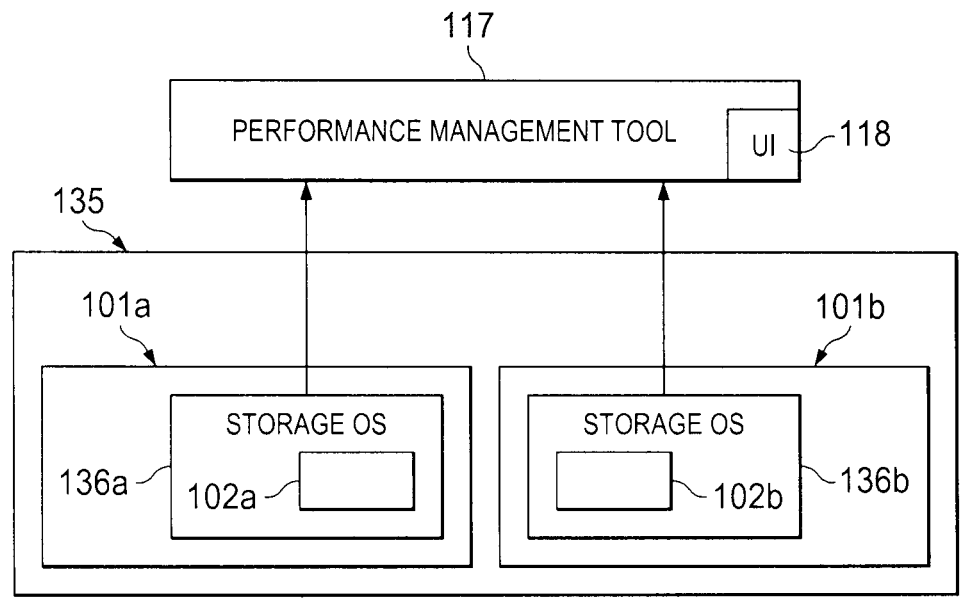
FIG. 2 is a simplified block diagram of an example relationship among applications and a storage cluster according to some embodiments.

FIG. 2 is a block diagram illustration of an exemplary conceptual layout according to one embodiment. Application 117 is a performance management application that provides for trouble shooting and performance archiving of the storage cluster 135. As explained above with respect to FIG. 1, tool 117 may be run in a VM in a storage server; additionally or alternatively, a performance management tool may be embodied as an application run on a client (not shown) or on any appropriate computer in communication with cluster 135.

A human user interacts with performance management tool 117 via UI 118. UI 118 may include a command line interface, a graphical user interface (GUI), or other appropriate interface. The human user may rely on UI 118 for troubleshooting and viewing performance data. For instance, the human user may input information identifying requested performance statistics, configure alarms, and configure archiving settings (among other functions) using UI 118.

Storage Operating Systems (OSs) 136 run on storage controllers 100 (FIG. 1). The scope of embodiments may include any appropriate OS that provides low-level control to implement virtual storage on storage drives. Collection tools 102 are programs that run on storage OS 136 to sample performance data and to transmit the performance data to application 117. The example of FIG. 2 shows each storage controller 101 in cluster 135 runs its own collection tool 102. However, in other embodiments, various cluster configurations may include a single instance of collection tool 102 that samples data from each of the individual storage controllers.

Storage OS instances 136 run on one or more processors at storage controllers 100. Also, communication between storage OSs 136 and performance management tool 117 go through communication links, such as network 167 (FIG. 1). Processing power at the storage controllers 100 and bandwidth at network 167 may be limited, and various embodiments provide a way of using the processing power and bandwidth in more efficient ways than was provided by conventional systems. For instance, collection tools 102 send sampled performance data to performance management tool 117 according to a work-based counter rather than by a system clock-based counter. Thus, data for high-workvolume functional storage entities is sent more often, whereas data for low-work-volume entities is sent much less often. Since the storage OS 136 is not sending data for less relevant storage items, the processing power and bandwidth that would be used to transmit such performance data from collection tool 102 to performance management tool 117 is conserved. A work-based counter is described in more detail with respect to FIG. 3.

Figure 3:
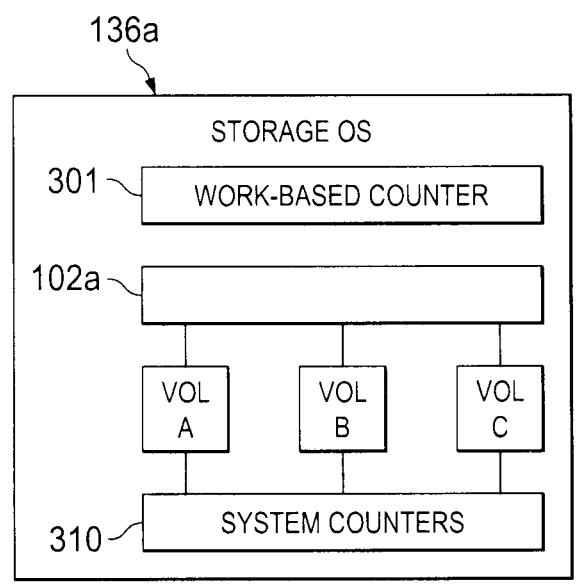
FIG. 3 is a simplified diagram of a relationship among a storage operating system, a collection tool, and storage volumes according to some embodiments.

FIG. 3 shows a relationship among storage OS instance 136*a*, storage volumes A-C, and system counters 310. For ease of illustration, FIG. 3 focuses on storage OS instance 136*a*, and it is understood that similar functions may be performed at storage OS instance 136*b*.

Storage OS instance 136*a* includes work-based counter 301. In some embodiments, work-based counter 301 tracks a number of operations performed by storage volumes A-C. In other embodiments, work-based counter may track a throughput parameter (e.g., MB written to and read from a volume). In fact, various embodiments may employ any appropriate type of work-based counter can be used to identify objects in cluster 135 that are of increased interest for performance monitoring.

Storage volumes A-C are shown for simplicity, and it is understood that a real-world implementation of a storage system may include dozens, hundreds, or more storage volumes. Specifically, storage system 190 provides virtual storage, thereby allowing an administrator to set up an arbitrary number of virtual volumes, perhaps even tens of thousands of virtual volumes for a large enterprise.

Work-based counter 301 includes at least one counter for each respective storage entity in the cluster. As mentioned above, storage entities in the cluster may include, but are not limited to, storage volumes, storage drive aggregates, and nodes. The respective counters increment as work is performed by their corresponding storage entities. For instance, work-based counter 301 includes at least one counter corresponding to storage volume A, and as storage volume A completes a read or write operation or metadata operation, the counter is incremented by one. Alternatively, as storage column A reads or writes data, a counter may track an amount of data. In any event, collection tool 102 monitors work-based counter 301 and can compare each of the individual counters therein against one or more set thresholds, as explained in more detail with respect to FIGS. 4 and 5.

Collection tool 102 samples performance data for each of the storage volumes A-C according to an algorithm. In one example, collection tool 102 determines from work-based counter 301 that storage volume A has completed a number of read and write operations that exceed a threshold. In response, collection tool 102 samples performance data from system counters 310. Each of the volumes A-C is associated with various system components that affect its overall performance. For instance, response times for each of the underlying physical storage drives that store data for volume A may affect performance and are recorded in various ones of the system counters 310. Additionally, network connection errors may affect the performance of volume A, and various ones of the system counters 310 may track network latency, network failures, etc. Storage systems often include multi-tiered caching elements (such as RAM and FLASH) for performance optimization and the number of operations serviced from a certain cache level would be recorded in system counters 310 as well. Accordingly, when collection tool 102 samples for performance of volume A, it may save data from a number of individual counters within system counters 310 that indicate performance of volume A.

In some examples, various ones of the system counters 310 are software counters running at the various components of interest (e.g., running at an individual storage drive). Data from the sampled system counters 310 is saved in memory at a storage controller. Collection tool 102 samples performance data for volumes B and C as well when their respective performance counters indicate a threshold is reached.

It should be noted that performance parameters for each of volumes A-C may overlap. Specifically, individual ones of the system counters 310 may be relevant to more than one of the storage volumes A, B, or C to the extent that more than one volume saves data to a same physical storage drive or uses a same network connection or uses a caching device which may not provide data in an individual volume resolution. The selection of data resolution is driven by cost of data collection and value derived.

Figure 4:
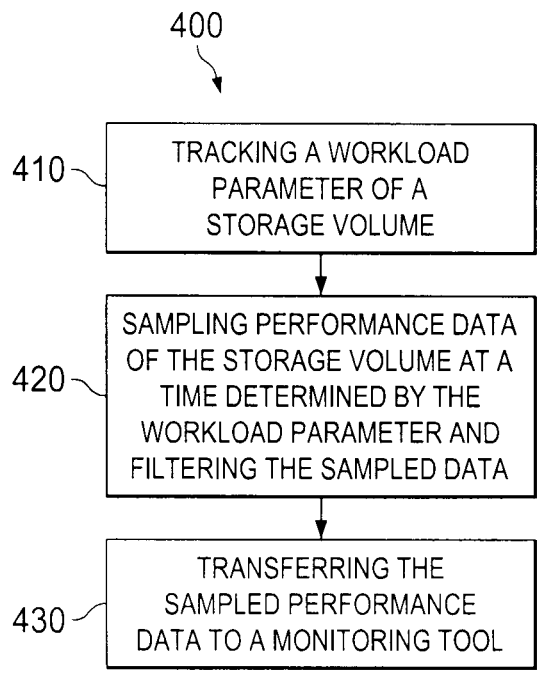
FIG. 4 is an illustration of an example method according to some embodiments.

FIG. 4 is a simplified block diagram of example process 400, adapted according to one embodiment. Process 400 includes the collection and transmission of system performance data and may be performed by one or more computer processors executing collection tool 102. For instance, a storage controller (e.g., controller 101*a* of FIG. 1) may run a storage OS that offers a variety of functions, where collection tool 102 is one such function.

Block 410 includes tracking a workload parameter of a storage volume. In one example, a storage OS keeps workload counters for a variety of storage entities, and a collection tool monitors the workload counters against thresholds. When the collection tool determines that a workload counter for the storage volume has reached the threshold, the collection tool moves to block 420. The workload parameter may include any appropriate parameter indicating an amount of work or busy time for a storage volume, examples including completed operation numbers, throughput information, queue wait time, execution time, number of concurrent operations and the like.

Block 420 includes sampling the performance data of the storage volume at a time determined by the workload parameter. In this example, the time is determined by the workload parameter because the collection tool performs the sampling in response to the monitored workload parameter crossing a threshold.

Sampling performance data may include capturing data from system counters in the storage system. However, the scope of embodiments includes any appropriate technique for capturing performance data from the various system components that affect reliability, speed, and other factors of the storage volume.

Block 430 includes transferring the sampled data to a monitoring tool. In some embodiments, the monitoring tool is a software application running at a storage server, a client, or any appropriate computer in communication with the storage controller. Transferring the data may include any appropriate processing that assists in transferring the sampled data to the monitoring tool. For instance, block 430 may in some examples include putting the sampled data into a file structure or other data structure. Depending on the type of data connection, the transferring may include packetizing the data as well.

The sampled data may be sent to the monitoring tool using any appropriate technique. For instance, the samples may be sent directly (e.g., pushed in a stream using sFlow version 5) or archived in the storage system and pulled out periodically or queried on an ongoing basis via Application Programming Interface (API).

The actions of blocks 410-430 represent overhead processing in the storage system, though the contribution of block 410 may be much smaller than that of the blocks 420 and 430. Process 400 minimizes the resources used in performing the actions of blocks 420 and 430 by performing the actions of blocks 420 and 430 for individual storage volumes in response to measuring the workload parameter. In other words, process 400 foregoes sampling the entirety of the performance data in favor of sampling performance data only for those storage volumes that are busy.

Various embodiments may define the workload parameter in any appropriate way to capture data from storage volumes that are busy enough to be relevant for the performance monitoring goal. For instance, in one example, the collection tool may be programmed to perform the actions of blocks 420 and 430 for a given storage volume when it is determined that that storage volume has performed one thousand operations. Of course, one thousand operations is merely an example, and an appropriate workload parameter with an appropriate threshold may be set for a given system according to available processing resources and troubleshooting needs. In some applications, a maximum data collection and transmission overhead of two percent of total processing power may be a target. In applications with an overhead target, workload parameter thresholds may be set so that overhead meets the target or comes in under the target.

The scope of embodiments is not limited to the actions shown in FIG. 4. Other embodiments may add, omit, rearrange, or modify one or more actions as appropriate. For instance, some embodiments may include performing the actions of blocks 410, 420, and 430 for each of the various storage volumes of the storage system, sampling and transferring performance data for a given storage volume when that given storage volume's workload reaches a threshold. Process 400 may be performed continually for as long as the system is in operation. Additionally, the example above is directed to an embodiment that samples performance data for a storage volume, though the various embodiments may include performing the same functions with respect to other types of functional storage entities, such as storage drive aggregates and nodes.

It should be noted that the examples above are given in the context of a network storage system, through the scope of embodiments is not so limited. Rather, the concepts described above may be implemented in any type of computing cluster, wherein performance data is sampled and analyzed. One example embodiment includes a cluster of server nodes, where performance data for the server nodes themselves, as well as for the applications running on the server nodes, is sampled according to a workload of each node or application. Process 400 would transfer the sampled data to an analysis application for further processing.

Figure 5:
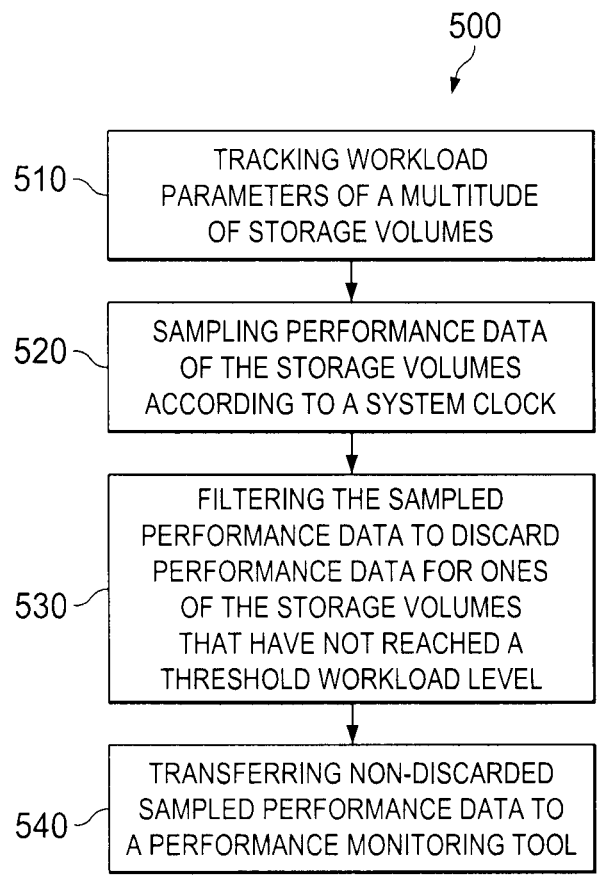
FIG. 5 is an illustration of an example method according to some embodiments.

FIG. 5 is a simplified block diagram of example process 500, adapted according to one embodiment. Process 500 includes the collection and transmission of system performance data and may be performed by one or more computer processors executing collection tool 102. For instance, a storage controller (e.g., controller 100a of FIG. 1) may run a storage OS that offers a variety of functions, where collection tool 102 is one such function.

At block 510, the system tracks workload parameters of a multitude of storage volumes. The action of block 510 is substantially the same as the action of block 410 (FIG. 4), described above.

Block 520 includes sampling performance data of the storage volumes according to a system clock. The sampling itself is substantially the same as that described above with respect to block 420 (FIG. 4), except that the sampling of block 520 is performed at a period according to a system clock (e.g., once every five minutes). In this example, the action of block 520 is performed for each of the storage volumes at the specified period so that the sampled data at a given time applies to each of the storage volumes.

Block 530 includes filtering the sampled performance data to discard performance data for ones of the storage volumes that have not reached a threshold workload level. Thus, block 530 includes checking performance counters for each of the storage volumes for a threshold level of workload and discarding performance data for those storage volumes that do not reach the threshold level. In this manner, the collection tool reduces the amount of data to be transferred according to the workload parameters.

Block 540 includes transferring the non-discarded sampled performance data to a performance monitoring tool. Block 540 is substantially similar to block 430 of (FIG. 4).

Just as with process 400 of FIG. 4, the actions of FIG. 5 may be applied to any computing cluster, not just clusters that provide storage. In other words, the actions of FIG. 5 may be applied to any appropriate type of computing cluster (e.g., a cluster of server nodes) where data is sampled and analyzed.

Furthermore, it should be noted that both processes 400 and 500 provide techniques to send performance data to the performance management tool in accordance with a work-based counter of the storage system. Specifically, process 400 performs sampling according to a workload parameter and, thus, the transmitting also is performed according to a workload parameter. Similarly, process 500 discards the data that does not meet a threshold workload level, and transmitting is also performed according to the workload parameter.

Various embodiments provide one or more advantages over conventional systems. As noted above, conventional systems sample and transfer performance data based on a system clock and, as a result, waste resources on data that is not relevant or valuable (e.g., performance data for storage volumes that are idle or nearly idle). By contrast, various embodiments transfer more valuable data and do not sample (or filter out) less relevant data, thereby conserving processing and network resources. Put another way, storage entities with high-level workloads receive better data resolution.

Also, some embodiments decouple data collection overhead from storage entity count. Those embodiments may allow for data collection overhead to be set at a fixed level regardless of the number of entities to be monitored.

Additionally, various embodiments may enable a performance monitoring tool to generate performance incident alerts faster than conventional systems. In a conventional system that samples and sends performance data every five minutes, it may be an average of two and a half or seven and a half minutes before a user is alerted to performance problems. By contrast, performance alerts are generally more likely to affect the busiest entities in the storage system, and various embodiments propose to sample the data from the busiest entities at a higher frequency. Thus, alerts may be generated more quickly than in conventional systems.

When implemented via computer-executable instructions, various elements of embodiments of the present disclosure are in essence the software code defining the operations of such various elements. The executable instructions or software code may be obtained from a non-transient, tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

In the embodiments described above, example clients 160, server 110, and storage controllers 101 include processor-based devices and may include general-purpose processors or specially-adapted processors (e.g., an Application Specific Integrated Circuit). Such processor-based devices may include or otherwise access the non-transient, tangible, machine readable media to read and execute the code. By executing the code, the one or more processors perform the actions of processes 400 and/or 500 as described above.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method, comprising:
   maintaining a plurality of work-based counters by a storage operating system of a storage system node in networked storage system having a plurality of storage devices for storing data, each work-based counter associated with a functional entity of a plurality of functional entities and each work-based counter configured to track a workload parameter indicating an amount of work performed by each of the plurality of functional entities,
   wherein the plurality of functional entities include a storage volume, a storage drive aggregate and nodes of the networked storage environment and the workload parameter includes a number of completed operations by each of the plurality of functional entities and throughput information indicating an amount of data processed by the plurality of functional entities; and wherein each of the plurality of work-based counters includes a counter for counting a number of operations performed by each of the plurality of functional entities; and a counter for tracking a throughput parameter of the plurality of functional entities;
   maintaining a plurality of performance counters separate from the plurality of work-based counters for each of the plurality of functional entities by the storage operating system, where the plurality of performance counters track performance parameters of components associated with each of the plurality of functional entities;
   comparing work-based counter values for each of the work-based counters to a threshold value assigned to each of the work-based counter, where the threshold value provides an indication to sample data from the plurality of performance counters;
   determining that a first one of the work-based counters has reached a threshold value;
   sampling performance data from a performance counter of a first functional entity associated with the first one of the work-based counters that has reached the threshold value;
   sampling the plurality of performance counters, associated with the plurality of functional entities, according to a system clock;
   filtering the sampled performance counters by the plurality of work-based counter values to eliminate ones of the sampled performance counters from a functional entity that has not reached a threshold number of operations; and
   presenting the sampled performance data to an analysis tool separate from the storage operating system of the storage system node.

2. The method of claim 1, wherein the first one of the work-based counters tracks a number of storage operations performed by the first functional entity.

3. The method of claim 1, wherein the first one of the work-based counters tracks an amount of throughput of the first functional entity.

4. The method of claim 1, wherein the first functional entity comprises a logical volume that is implemented on a plurality of physical storage drives.

5. The method of claim 4, wherein the sampled performance data includes response times for the plurality of physical storage drives.

6. The method of claim 4, wherein the workload parameter indicates a throughput of the logical volume and a number of storage operations performed by the logical volume.

7. A non-transitory, machine readable medium having stored thereon instructions comprising machine executable code which when executed by a machine, causes the machine to:
   maintain a plurality of work-based counters by a storage operating system of a storage system node in networked storage system having a plurality of storage devices for storing data, each work-based counter associated with a functional entity of a plurality of functional entities and each work-based counter configured to track a workload parameter indicating an amount of work performed by each of the plurality of functional entities,
   wherein the plurality of functional entities include a storage volume, a storage drive aggregate and nodes of the networked storage environment and the workload parameter includes a number of completed operations by each of the plurality of functional entities and throughput information indicating an amount of data processed by the plurality of functional entities; and wherein each of the plurality of work-based counters includes a counter for counting a number of operations performed by each of the plurality of functional entities; and a counter for tracking a throughput parameter of the plurality of functional entities;
   maintain a plurality of performance counters separate from the plurality of work-based counters for each of the plurality of functional entities by the storage operating system, where the plurality of performance counters track performance parameters of components associated with each of the plurality of functional entities;
   compare work-based counter values for each of the work-based counters to a threshold value assigned to each of the work-based counter, where the threshold value provides an indication to sample data from the plurality of performance counters;
   determine that a first one of the work-based counters has reached a threshold value;
   sample performance data from a performance counter of a first functional entity associated with the first one of the work-based counters that has reached the threshold value;

sample the plurality of performance counters, associated with the plurality of functional entities, according to a system clock;

filter the sampled performance counters by the plurality of work-based counter values to eliminate ones of the sampled performance counters from a functional entity that has not reached a threshold number of operations; and present the sampled performance data to an analysis tool separate from the storage operating system of the storage system node.

8. The non-transitory, storage medium of claim 7, wherein the first one of the work-based counters tracks a number of storage operations performed by the first functional entity.

9. The non-transitory, storage medium of claim 7, wherein the first one of the work-based counters tracks an amount of throughput of the first functional entity.

10. The non-transitory, storage medium of claim 7, wherein the first functional entity comprises a logical volume that is implemented on a plurality of physical storage drives.

11. The non-transitory, storage medium of claim 10, wherein the sampled performance data includes response times for the plurality of physical storage drives.

12. The non-transitory, storage medium of claim 10, wherein the workload parameter indicates a throughput of the logical volume and a number of storage operations performed by the logical volume.

13. A system, comprising:

a memory containing machine readable medium comprising machine executable code having stored thereon instructions; and a processor module coupled to the memory, the processor module configured to execute the machine executable code to:

maintain a plurality of work-based counters by a storage operating system of a storage system node in networked storage system having a plurality of storage devices for storing data, each work-based counter associated with a functional entity of a plurality of functional entities and each work-based counter configured to track a workload parameter indicating an amount of work performed by each of the plurality of functional entities, wherein the plurality of functional entities include a storage volume, a storage drive aggregate and nodes of the networked storage environment and the workload parameter includes a number of completed operations by each of the plurality of functional entities and throughput information indicating an amount of data processed by the plurality of functional entities; and wherein each of the plurality of work-based counters includes a counter for counting a number of operations performed by each of the plurality of functional entities; and a counter for tracking a throughput parameter of the plurality of functional entities;

maintain a plurality of performance counters separate from the plurality of work-based counters for each of the plurality of functional entities by the storage operating system, where the plurality of performance counters track performance parameters of components associated with each of the plurality of functional entities;

compare work-based counter values for each of the work-based counters to a threshold value assigned to each of the work-based counter, where the threshold value provides an indication to sample data from the plurality of performance counters;

determine that a first one of the work-based counters has reached a threshold value;

sample performance data from a performance counter of a first functional entity associated with the first one of the work-based counters that has reached the threshold value;

sample the plurality of performance counters, associated with the plurality of functional entities, according to a system clock;

filter the sampled performance counters by the plurality of work-based counter values to eliminate ones of the sampled performance counters from a functional entity that has not reached a threshold number of operations; and present the sampled performance data to an analysis tool separate from the storage operating system of the storage system node.

14. The system of claim 13, wherein the first one of the work-based counters tracks a number of storage operations performed by the first functional entity.

15. The system of claim 13, wherein the first one of the work-based counters tracks an amount of throughput of the first functional entity.

16. The system of claim 13, wherein the first functional entity comprises a logical volume that is implemented on a plurality of physical storage drives.

17. The system of claim 16, wherein the workload parameter indicates a throughput of the logical volume and a number of storage operations performed by the logical volume.

* * * * *